(No Model.) 6 Sheets—Sheet 1.
J. H. VAILE.
APPARATUS FOR ACTUATING HYDROSTATIC PRESSES.
No. 415,750. Patented Nov. 26, 1889.

Witnesses:
W. C. Jirdinston.
Charles Billow.

Inventor:
John H. Vaile
by Peck & Rector
his Attorneys.

(No Model.) 6 Sheets—Sheet 2.

J. H. VAILE.
APPARATUS FOR ACTUATING HYDROSTATIC PRESSES.

No. 415,750. Patented Nov. 26, 1889.

Fig. 3.

Witnesses:
W. C. Jirdinston.
Charles Billon.

Inventor:
John H. Vaile
by Peck & Rector
his Attorneys.

(No Model.) 6 Sheets—Sheet 5.

J. H. VAILE.
APPARATUS FOR ACTUATING HYDROSTATIC PRESSES.

No. 415,750. Patented Nov. 26, 1889.

(No Model.) 6 Sheets—Sheet 6.
J. H. VAILE.
APPARATUS FOR ACTUATING HYDROSTATIC PRESSES.

No. 415,750. Patented Nov. 26, 1889.

UNITED STATES PATENT OFFICE.

JOHN H. VAILE, OF DAYTON, OHIO.

APPARATUS FOR ACTUATING HYDROSTATIC PRESSES.

SPECIFICATION forming part of Letters Patent No. 415,750, dated November 26, 1889.

Application filed December 24, 1888. Serial No. 294,479. (No model.)

*To all whom it may concern:*

Be it known that I, JOHN H. VAILE, a citizen of the United States, residing at Dayton, in the county of Montgomery and State of Ohio, have invented certain new and useful Improvements in Apparatus for Actuating Hydrostatic Presses, of which the following is a full, clear, and exact description, reference being had to the accompanying drawings, forming part of this specification.

My invention relates to all classes of presses wherein a liquid is used to exert the pressure, and wherein pumps are used to create the pressure to be transmitted by the liquid to the substance to be compressed, and, as coming primarily within the object of my invention, it relates to hydrostatic presses for compressing substances of a very soft or plastic nature, as lard, paraffine, and the like, and more particularly for expressing oil from meal, seeds, or other oleaginous substances.

It has for its object the improvement in the construction and mode of operation of this class of presses and the rendering of the action of the same as nearly perfect as possible. Its novelty will be herein set forth, and specifically pointed out in the claims.

In the accompanying drawings, Figure 1, Sheet 1, is an elevation, partly in section, of so much of the apparatus as is necessary to illustrate my invention. Figs. 7 and 8, Sheet 6, are views of modifications to be hereinafter referred to.

The same letters are used to indicate identical parts in all the figures.

Figures 1, 2:
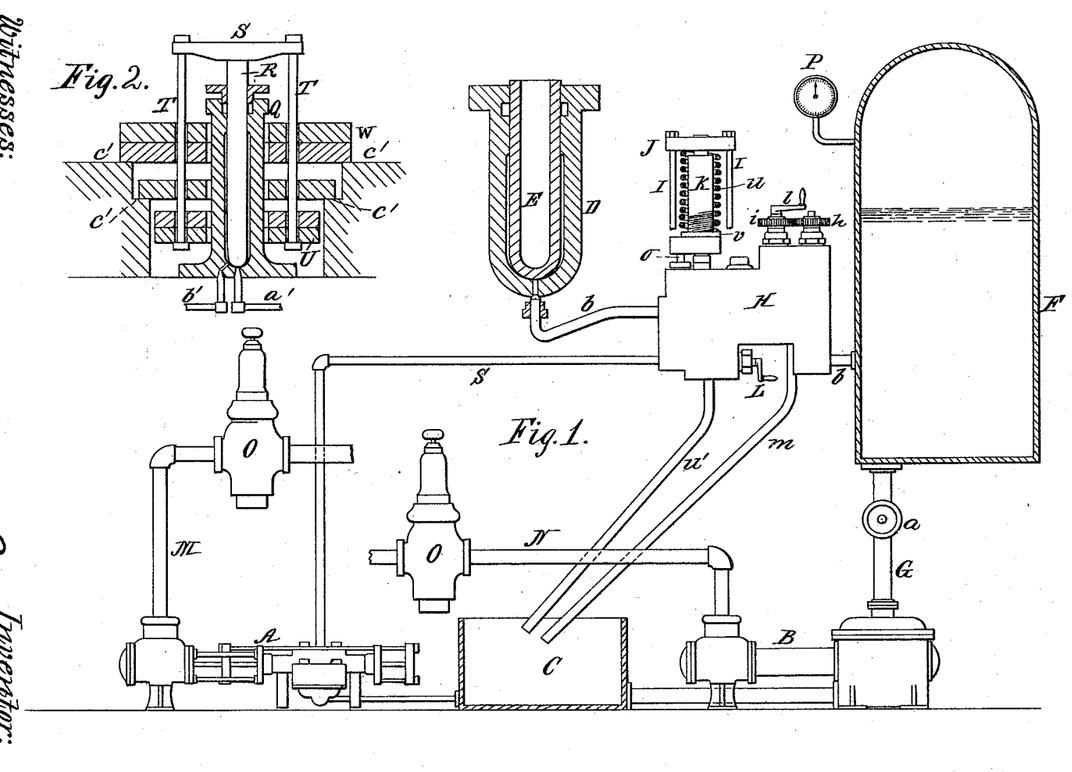
Figure 1:
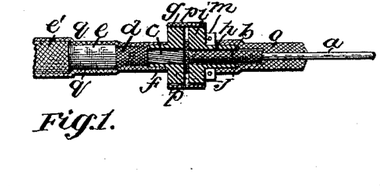
Figure 2:
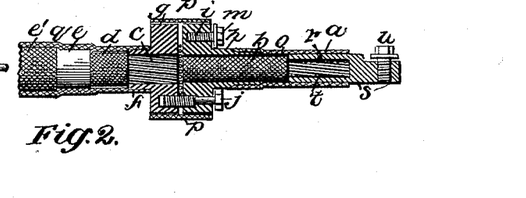
Fig. 2, Sheet 1, is a sectional elevation of a modified form of the variable accumulator.

A and B are two pumps of any character, in this instance steam-pumps of the usual or any suitable construction, pumping from a supply-tank C, containing the liquid, usually oil, for actuating the press.

D is the cylinder of a hydrostatic press of the usual or any suitable construction, and E its piston, to which the actuating press-platen (not shown) is secured.

F is a strong air-tight vessel, which I designate a "variable accumulator," and into which the pump B pumps through the pipe G, provided with a check or other valve $a$. A pipe $b\ b$ connects the accumulator F with the press-cylinder, and in this pipe is interposed the valve mechanism, (shown enlarged in Figs. 3, 4, and 5,) where H is a casing having at one side an inlet-port $c$, into which the pipe $b$ from the accumulator enters, and an outlet-port $d$ at the other side, with which the branch of the pipe $b$, between the press and valve, connects. Any suitable check-valve $e$ is seated in and controls a passage $f$ between the ports $c$ and $d$. Any suitable valve $g$ controls the port $c$ to open and close it, and in this instance the valve is operated by a gear-wheel $h$, with a square bore loose on the squared upper end of the valve-stem, and meshing with a similar gear-wheel $i$ upon a valve $j$, which controls a supplemental port $k$. The valve $j$ is provided with a crank $l$, and by this arrangement, whenever the valve $g$ is opened, the valve $j$ is closed, and vice versa. The port $k$ communicates with a discharge-pipe $m$, leading back to the supply-tank C.

Figure 3:
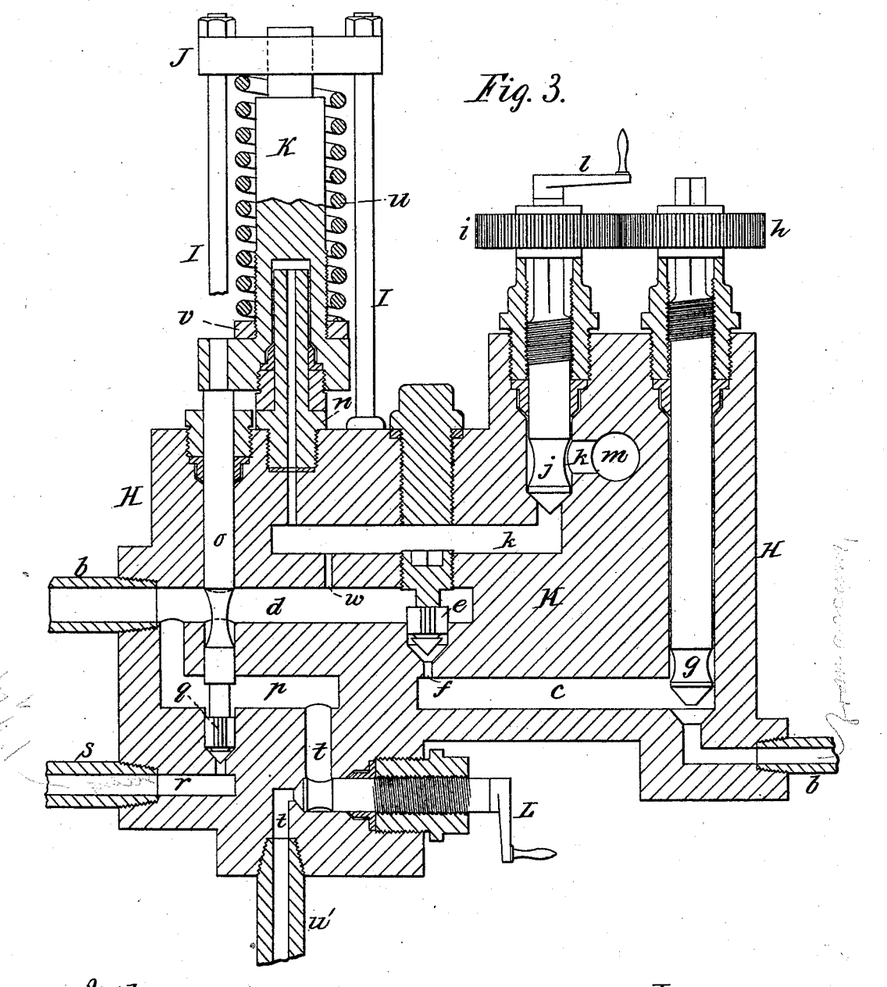
Fig. 3, Sheet 2, is an enlarged sectional elevation of the valve mechanism with the parts in the position of the first stage of the operation.
Figure 5:
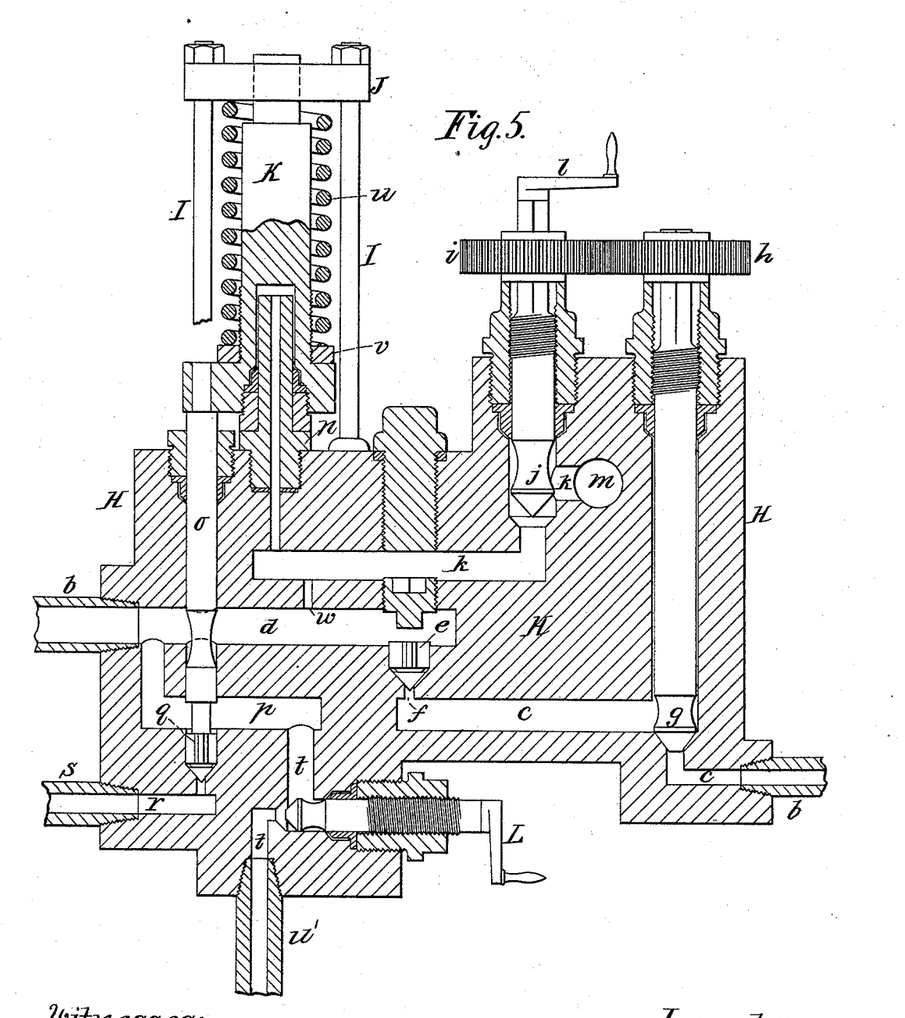
Fig. 5, Sheet 4, is a corresponding view with the parts in the position of the third stage of the operation.

Upon the top of the casing H are two uprights I, having at their upper ends a cross-head J, in which is guided the upper end of a plunger-cylinder K, whose lower end is fitted over and packed upon a nozzle $n$, having an opening through it communicating with the port $k$. The lower flanged end of the plunger has secured to it a valve-stem $o$, passed, with proper packing, down into the casing H, in this instance through the port $d$ and through a supplemental port $p$, communicating with the port $d$, and has attached to its lower end a valve $q$, which is seated in a passage between the port $p$ and an inlet-port $r$, with which a pipe S from the pump A communicates. The port $p$ communicates by a passage $t$, controlled by a hand-valve L, with a pipe $u'$, leading back to the supply-tank C. A spiral spring $u$ surrounds the plunger K, and is confined between its lower flanged end and the cross-head J. The stem $o$ is made closed by its spring *u*, the oil in the press-cylinder simultaneously escaping through the ports *d p t* and pipe *u'* to the tank C. The position of the valve parts at this stage of the operation is shown in Fig. 5. The press may be at once filled with fresh meal and restarted, for after the first operation the accumulator F is always charged, as before explained. In this way I can control the action of the press and get the best results, no matter how unskilled the attendant may be, for there can be no overpressure given at first, which might burst the bags and squeeze out the meal, but, on the contrary, the action of the press is at first rapid, with a decreasing low pressure until working contact is made, after which the pressure steadily and gradually increases as the meal is condensed and the surplus oil exudes, and it is then automatically put under the maximum pressure.

Figure 8:
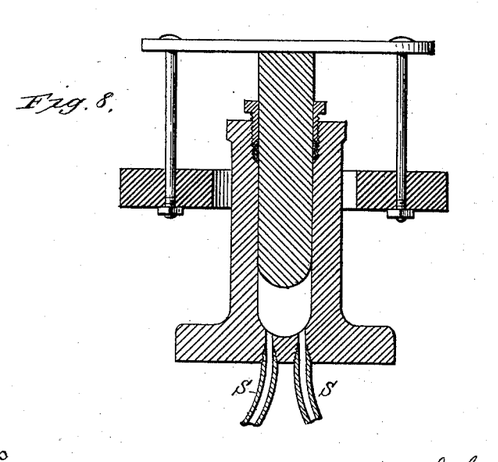

While I have shown the pump A as pumping directly to the press, it is of course understood that it may pump to a constant accumulator with the required maximum pressure, which accumulator would be connected with the port *r*, leading to the press, as shown, for instance, in Fig. 8, wherein a cylinder and loaded plunger are shown, S S indicating the pipes leading from the pump and to the press. Again, while I have shown as the preferred form of variable accumulator a vessel in which air is compressed, any other accumulator which is variable would answer. For instance, in Fig. 2 I have shown another form of variable accumulator, where Q is a cylinder with a packed piston R, having at its top a cross-head S, with pendent arms T, carrying at their bottoms the constant weights U, above which are arranged a series of pick-up weights V W. The liquid enters from the pump B through the pipe *a'* and discharges into the port *c* through the pipe *b'*. As the piston R is raised, the resistance is first increased by picking up the weight V, and finally increased to the maximum by picking up the weights W, whereupon the pump B stops. Upon opening the valve *g* the liquid escapes to the press, first with the maximum pressure of the accumulator, and then with a decreasing pressure as the pick-up weights are arrested by any suitable stops, as the shoulders *c'*, as will be readily understood.

Instead of the pick-up weights, springs might be applied to the piston R in a manner to exert a maximum pressure thereon when it is elevated, which pressure would decrease as the piston descends and the tension of the springs is released.

Figure 6:
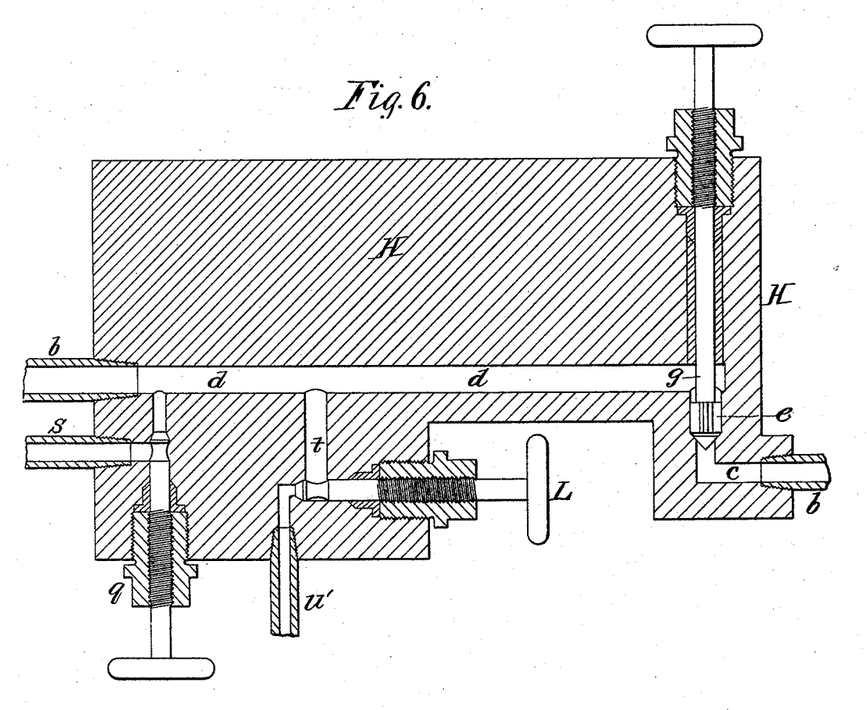
Fig. 6, Sheet 5, represents a modification in the construction of the valve mechanism.
Figure 7:
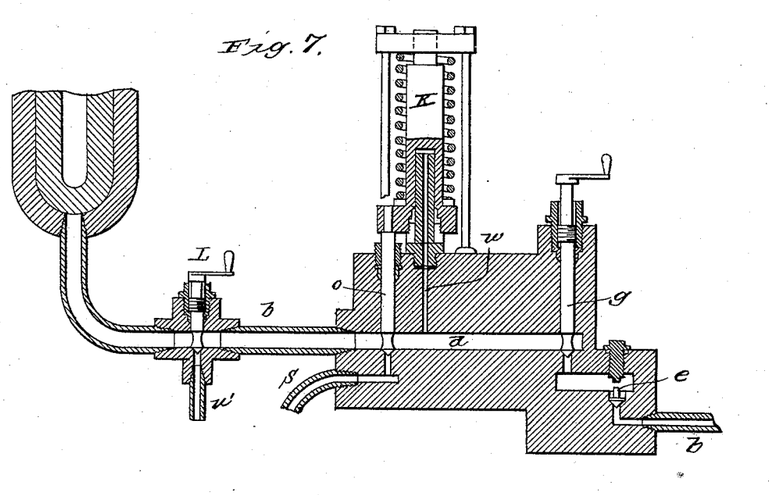

The particular construction and arrangement of the several parts of the valve mechanism may be varied without departing from my invention. For instance, the outlet-port *k*, valve *j*, and pipe *m* might be dispensed with entirely and the passage *w* made to communicate directly with the nozzle *n*, while the outlet-port *t*, with its valve L and the pipe *u'*, might be located at any suitable point between the casing H and the press-cylinder, or even in the latter, if desired, and the check-valve *e* might be located between the valve *g* and the accumulator, all as shown in the modification, Fig. 7. Again, the plunger K may be loaded with a constant dead-weight to overcome the pressure of the pump A, and the spring *u* be set to a pressure slightly less than the maximum pressure in the accumulator. Furthermore, while I prefer that the valve *q* should be automatically actuated by the pressure of the liquid, yet a considerable portion of the advantages of my invention may be obtained even if this valve be made an ordinary stop-valve to be operated by the attendant, in which event the plunger R and all of its associate mechanism would of course be dispensed with. In Fig. 6 I have illustrated a simplified form of valve mechanism embodying such construction and also dispensing with the port *k*, valve *j*, pipe *m*, passage *w*, and the separate check-valve *e*. In this modified form of construction the check *e* and stop-valve *g* are combined and merged into one valve, the check *e* being separate from but held to its seat by the stem *g*, so that upon unscrewing and raising the latter the pressure from the accumulator will lift the check to open the passage between the ports *c* and *d*, and upon screwing down the stem *g* the check *e* will be forced to its seat and the passage closed. Under this construction, at the beginning of the operation the valve-stem *g* will be unscrewed by the attendant to permit the check *e* to be lifted to open the passage from the accumulator to the press. The liquid will rush through the passage to the press and the pressure in the accumulator will be rapidly decreased. When the pump B has restored the pressure in the accumulator to or nearly to its maximum degree, as will be indicated on the pressure-gage P, the attendant will open the valve *q* and admit the liquid from the high-pressure pump to the press. The moment the valve *q* is opened the back-pressure through the port *d* will close the check *e*. When the oil has been entirely expressed from the meal, the attendant will close the valve *q* and screw down the valve-stem *g* to hold the check *e* in its seat, and will then open the valve L to release the pressure from the press.

Figure 4:
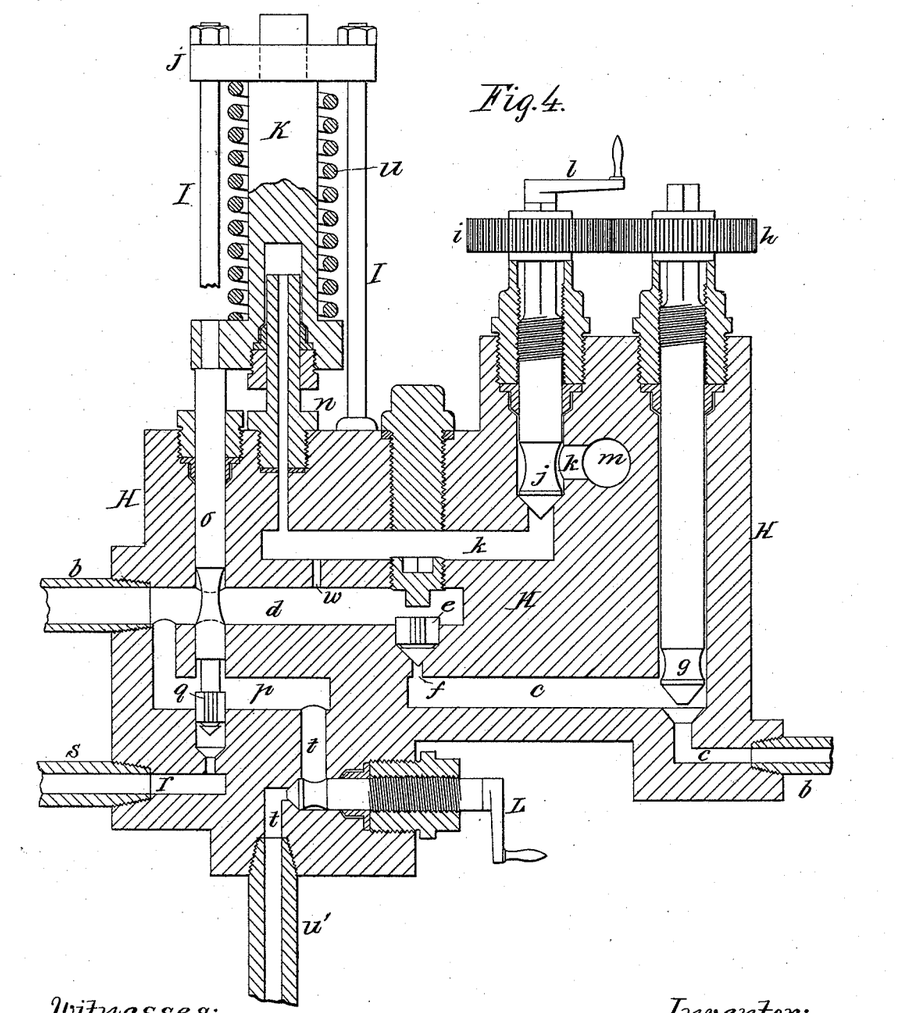
Fig. 4, Sheet 3, is a corresponding view with the parts in the position of the second stage of the operation.

While in both the forms of valve mechanism which I have illustrated it is convenient and advantageous to employ a check-valve in the passage from the accumulator to the press to automatically close said passage when the pressure from the high-pressure pump is admitted to the press, yet where the valve controlling the passage from said pump to the press is not automatic, but is simply a stop-valve, as illustrated in Fig. 6, it is not absolutely necessary that any check-valve be employed, and the valve in the passage from the accumulator to the press may be a simple stop-valve, such as the valve *g* in Figs. 3, 4, and 5. In such case it would be necessary for the attendant to close it by hand before opening the valve $q$.

While also in both forms of valve mechanism which I have illustrated the pipe S from the high-pressure pump is shown as communicating with a port in the casing H, instead of directly with the press, it will be understood that it may, especially where its controlling-valve is not an automatic one, be entirely disconnected from the casing H and communicate directly with the press.

The process involved in the use of the herein-described apparatus forms the subject-matter of a separate application, filed December 24, 1888, Serial No. 294,480, and no claim thereto is made in this application.

Having thus fully described my invention, I claim—

1. The combination, with a hydrostatic press and a source of pressure-supply connected thereto, of an interposed variable accumulator and a valve between said accumulator and press, the inflow to the accumulator from the source of pressure-supply being less than the outflow from it to the press, whereby when the accumulator is charged and the valve between it and the press is opened the liquid will first enter the press under a pressure rapidly decreasing until the pressure in the accumulator and that in the press are equalized, and will then gradually increase until the maximum pressure in the accumulator is restored from the source of pressure-supply.

2. The combination, with a hydrostatic press and a source of low-pressure supply connected thereto, of an interposed variable accumulator, a valve between said accumulator and press, the inflow to the accumulator from the source of low-pressure supply being less than the outflow from it to the press, whereby when the accumulator is charged and the valve between it and the press is opened the liquid will first enter the press under a pressure rapidly decreasing until the pressure in the accumulator and that in the press are equalized, and will then be put under a gradually-increasing pressure until the maximum pressure in the accumulator is restored from the source of low-pressure supply, an independent source of high-pressure supply connected to the press, and a valve controlling the latter to admit the high pressure to the press when the maximum low pressure in the accumulator has been restored.

3. The combination, with a hydrostatic press and a source of low-pressure supply connected thereto, of an interposed variable accumulator, a check and stop valve between said accumulator and press, the inflow to the accumulator from the source of low-pressure supply being less than the outflow from it to the press, whereby when the accumulator is charged and the valve between it and the press is opened the liquid will first enter the press under a pressure rapidly decreasing until the pressure in the accumulator and that in the press are equalized, and will then be put under a gradually-increasing pressure until the maximum pressure in the accumulator is restored from the source of low-pressure supply, an independent source of high pressure supply connected to the press, and a valve controlling the latter to admit the high pressure to the press when the maximum low pressure in the accumulator has been restored.

4. The combination, with a hydrostatic press and a source of low-pressure supply connected thereto, of an interposed variable accumulator for decreasing the pressure, a valve between said accumulator and press, an independent source of high-pressure supply, and a valve controlling the latter, actuated by the pressure of the liquid in the press to automatically admit the high pressure to the press when the pressure in the latter reaches a predetermined degree, substantially as and for the purpose described.

5. The combination, with a hydrostatic press and a low-pressure pump connected thereto, of an interposed variable accumulator for decreasing the pressure, a valve between said accumulator and press, a high-pressure pump, also connected to said press, and a valve controlling the same, actuated by the pressure of the liquid in the press to automatically admit high pressure to the press when the pressure on the latter reaches a predetermined degree, substantially as and for the purpose described.

6. The combination, with a hydrostatic press, a low-pressure supply, a passage connecting said press and low-pressure supply, and a check and stop valve in said passage, of a high-pressure supply, a passage connecting said press and high-pressure supply, and a valve in said passage actuated by the pressure of the liquid in the press to automatically admit high pressure to the press when the pressure in the latter reaches a predetermined degree, substantially as and for the purpose specified.

7. The combination, with a hydrostatic press and a low-pressure pump connected thereto for moving the platen, a check and stop valve between the pump and press, a high-pressure pump, also connected to said press, and a valve actuated by the pressure of the liquid in the press to automatically admit the high pressure to the press when the pressure in the latter reaches a predetermined degree, substantially as and for the purpose described.

8. The combination of a hydrostatic press and a source of low-pressure supply connected thereto for moving the platen, an interposed variable accumulator for decreasing the pressure, a check and stop valve between said accumulator and press, a source of high-pressure supply, also connected to said press, and a valve controlling the same, actuated by the pressure of the liquid in the press to automatically admit the high pressure to the press when the pressure in the latter reaches a predetermined degree, substantially as and for the purpose described.

9. The combination of a hydrostatic press and a low-pressure pump connected thereto, an interposed variable accumulator for decreasing the pressure, a check and stop valve between the accumulator and press, a high-pressure pump, also connected to said press, and a valve controlling the same and actuated by the pressure of the liquid in the press to automatically admit the high pressure to the press when the pressure in the latter reaches a predetermined degree, substantially as and for the purpose described.

10. The combination, with a hydrostatic press, a low-pressure pump, an interposed variable accumulator, and a high-pressure pump, of a valve mechanism located between the press and the high-pressure pump and accumulator, and consisting of a casing having a main port or passage communicating at one end with the accumulator and at the other with the press, a valve in said passage, a second port communicating at one end with the high-pressure pump and at the other with the main port at a point between its valve and the press, and a valve controlling said second port, substantially as and for the purpose described.

11. The combination, with a hydrostatic press, a low-pressure pump, an interposed variable accumulator, and a high-pressure pump, of a valve mechanism located between the press and the high-pressure pump and accumulator, and consisting of a casing having a main port or passage communicating at one end with the accumulator and at the other with the press, a check and stop valve in said passage, a second port communicating at one end with the high-pressure pump and at the other with the main port at a point between the check-valve and the press, and a valve controlling said second port, substantially as and for the purpose described.

12. The combination, with a hydrostatic press, a low-pressure pump, an interposed variable accumulator, and a high-pressure pump, of a valve mechanism located between the press and the high-pressure pump and accumulator, and consisting of a casing having a main port or passage communicating at one end with the press and at the other with the accumulator, a check and stop valve in said passage, a passage admitting pressure from the high-pressure pump to the press, and an automatic valve controlling said passage and actuated by the pressure from the high-pressure pump and accumulator, substantially as and for the purpose described.

13. The herein-described valve mechanism, consisting of the casing H, with its ports $c$, $d$, $k$, $p$, $t$, and $r$, the passage $w$, connecting the ports $d$ $k$, the check-valve $e$ between the ports $c$ $d$, the hand-valves $g$ $j$ L, discharge-pipes $m$ $u'$, and the automatic valve $q$, controlled by the stem $o$, weighted piston-plunger K, and nozzle $n$, communicating with the port $k$, substantially as and for the purpose specified.

JOHN H. VAILE.

Witnesses:
W. C. JIRDINSTON,
CHARLES BILLON.

(No Model.)

B. H. WESSLAU & G. TRAUTWEIN.
JOINT FOR COUPLING UNDERGROUND CABLES.

No. 415,751. Patented Nov. 26, 1889.

WITNESSES

INVENTORS